US007777767B2

(12) United States Patent
Tomita et al.

(10) Patent No.: US 7,777,767 B2
(45) Date of Patent: Aug. 17, 2010

(54) IMAGE FORMING APPARATUS AND METHOD OF ADJUSTING COLOR SHIFT

(75) Inventors: Norio Tomita, Nara (JP); Yoshikazu Harada, Nara (JP); Kengo Matsuyama, Osaka (JP); Shinichi Yamane, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 915 days.

(21) Appl. No.: 11/592,051

(22) Filed: Nov. 1, 2006

(65) Prior Publication Data

US 2007/0109393 A1 May 17, 2007

(30) Foreign Application Priority Data

Nov. 14, 2005 (JP) ............................. 2005-328987

(51) Int. Cl.
*B41J 2/385* (2006.01)
*B41J 2/47* (2006.01)
*B41J 2/435* (2006.01)
*G01D 15/14* (2006.01)

(52) U.S. Cl. ....................... 347/116; 347/229; 347/234; 347/248

(58) Field of Classification Search ................. 399/301; 347/116, 234, 248
See application file for complete search history.

(56) References Cited

U.S. PATENT DOCUMENTS 6,282,396 B1 * 8/2001 Iwata et al. ................. 399/301
6,317,147 B1 11/2001 Tanaka
2005/0212887 A1 * 9/2005 Tanaka et al. ............... 347/116

FOREIGN PATENT DOCUMENTS

| | | |
|---|---|---|
| JP | 2000-098810 | 4/2000 |
| JP | 2002-006584 | 1/2002 |
| JP | 2002-207338 | 7/2002 |

* cited by examiner

*Primary Examiner*—Stephen D Meier
*Assistant Examiner*—Sarah Al-Hashimi
(74) *Attorney, Agent, or Firm*—Edwards Angell Palmer & Dodge LLP; David G. Conlin; Peter J. Manus

(57) ABSTRACT

An image forming apparatus includes an image forming unit that forms a color image in which a plurality of color component images are superimposed; and a formation controlling unit that allows the image forming unit to form images for adjustment of formation positions of the respective color component images. The formation controlling unit allows the image forming unit to form, for each color, a plurality of adjustment images having different tilts with respect to a main scanning direction. A shift of a detected position of each adjustment image from a reference position in which each adjustment image should be formed is calculated, a tilt and an intercept of a regression line that uses the reference positions and the calculated shifts as variables are calculated, and a shift in the main scanning direction and a shift in a sub-scanning direction are determined based on the calculated tilt and intercept.

6 Claims, 13 Drawing Sheets

IMAGE FORMING APPARATUS AND METHOD OF ADJUSTING COLOR SHIFT

CROSS-REFERENCE TO RELATED APPLICATIONS

This Nonprovisional application claims priority under 35 U.S.C. §119(a) on Patent Application No. 2005-328987 filed in Japan on Nov. 14, 2005, the entire contents of which are hereby incorporated by reference.

BACKGROUND OF THE INVENTION

The present invention relates to an image forming apparatus including an image forming unit that forms a color image in which a plurality of color component images are superimposed; and a formation controlling unit that allows the image forming unit to form images for adjustment of formation positions of the color component images, and a method of adjusting a color shift in the image forming apparatus.

In image forming apparatuses capable of forming color images, such as copiers and multifunction devices, a color image is formed by superimposing color component images of C (cyan), M (magenta), Y (yellow), and K (black), for example. To maintain good image quality of a color image, it is important to minimize the shift in the formation position of each color component image, which is caused by an influence of periodic speed variations of photosensitive bodies or the like. Hence, marks for adjustment of color component images of C, M, Y, and K are formed, the presence/absence of a color shift in the color component images is checked, and if there is a color shift, then a formation position is corrected (see Japanese Patent Application Laid-Open No. 2002-207338, for example).

BRIEF SUMMARY OF THE INVENTION

FIG. 1 is a schematic diagram showing exemplary conventional adjustment marks. The adjustment marks are transferred from photosensitive bodies to a transfer belt 30 but are not transferred from the transfer belt 30 to a sheet. A plurality of adjustment marks for a sub-scanning direction and a plurality of adjustment marks for a main scanning direction are formed for each color (K, C, M, and Y). As such, since the adjustment marks for the sub-scanning direction and the adjustment marks for the main scanning direction are formed separately and a shift in a formation position in the sub-scanning direction and a shift in a formation position in the main scanning direction are detected separately, a large amount of toner and a long period of time are required for correction of the formation positions.

The present invention is made in view of the foregoing and other problems. An object of the present invention is therefore to provide an image forming apparatus capable of reducing the amount of toner used for adjustment of an image formation position and an adjustment time by allowing an image forming unit to form, for each color, a plurality of adjustment images having different tilts with respect to an image formation direction, and a method of adjusting a color shift.

Another object of the present invention is to provide an image forming apparatus capable of grasping influences (for example, a periodic deviation of the movement speed of a photosensitive body surface due to eccentricity of a rotation center axis thereof or the like) associated with the rotation period of photosensitive bodies on adjustment of an image formation position, and a method of adjusting a color shift.

An image forming apparatus of the present invention comprises: an image forming unit that forms a color image in which a plurality of color component images are superimposed; and a formation controlling unit that allows the image forming unit to form, in a predetermined direction, a plurality of images for adjustment of formation positions of the respective color component images, wherein the formation controlling unit allows the image forming unit to form, for each color, a plurality of adjustment images having different tilts with respect to the predetermined direction. In the present invention, the image forming unit forms, for each color, a plurality of adjustment images having different tilts with respect to an image formation direction (a sub-scanning direction or a main scanning direction). Thus, when the adjustment images are shifted in the sub-scanning direction, detected positions of the adjustment images are shifted all at a comparable level. When the adjustment images are shifted in the main scanning direction, detected positions of the adjustment images are shifted substantially proportionally or inversely proportionally to the tilt. Hence, the shift in the sub-scanning direction and the shift in the main scanning direction can be detected by one set of adjustment images made up of a plurality of adjustment images having different tilts. Comparing with two sets of conventional adjustment images for the main scanning direction and the sub-scanning direction, the number of adjustment images is reduced by half. Accordingly, the amount of toner used for adjustment of an image formation position and an adjustment time can be significantly reduced.

The image forming apparatus of the present invention may further comprise: a first calculating unit that calculates a shift of a detected position of each adjustment image from a reference position in which each adjustment image should be formed; a second calculating unit that calculates a tilt and an intercept of a regression line that uses the reference positions and the calculated shifts as variables; and a third calculating unit that calculates a shift in a main scanning direction and a shift in a sub-scanning direction based on the calculated tilt and intercept. In the present invention, a shift of a detected position of each adjustment image from a reference position in which each adjustment image should be formed is calculated, a tilt and an intercept of a regression line that uses the reference positions and the calculated shifts as variables are calculated, and a shift in the main scanning direction and a shift in the sub-scanning direction are determined based on the calculated tilt and intercept. When the adjustment images are shifted in the sub-scanning direction, detected positions of the adjustment images are shifted all at a comparable level. When the adjustment images are shifted in the main scanning direction, detected positions of the adjustment images are shifted substantially proportionally or inversely proportionally to the tilt. Hence, the shift in the sub-scanning direction is determined from an intercept of a regression line that uses the reference positions and the calculated shifts as variables and the shift in the main scanning direction is determined from a tilt of the regression line.

The image forming apparatus of the present invention may further comprise a plurality of photosensitive bodies each having a drum shape, on which the image is formed, wherein the formation controlling unit may allow the image forming unit to form a plurality of adjustment images over a length of a circumference of each of the photosensitive bodies. In the present invention, the image forming unit forms a plurality of adjustment images over the length of the circumference of each photosensitive body. Thus, influences associated with the rotation period of the photosensitive bodies on adjustment of an image formation position can be grasped.

In the image forming apparatus of the present invention, the photosensitive bodies may be rotated, and the image forming apparatus may further comprise a fourth calculating unit that calculates a reference phase of rotation of each of the photosensitive bodies based on differences between the calculated shifts and the regression line. In the present invention, a reference phase of the rotation of each photosensitive body is calculated based on differences between calculated shifts and a regression line. Thus, by allowing the reference phases of the respective photosensitive bodies to mach with one another, influences associated with the rotation period of the photosensitive bodies on adjustment of an image formation position can be grasped.

The above and further objects and features of the invention will more fully be apparent from the following detailed description with accompanying drawings.

DETAILED DESCRIPTION OF THE INVENTION

The present invention will be described in detailed below based on the drawings showing an embodiment thereof.

Figure 1:
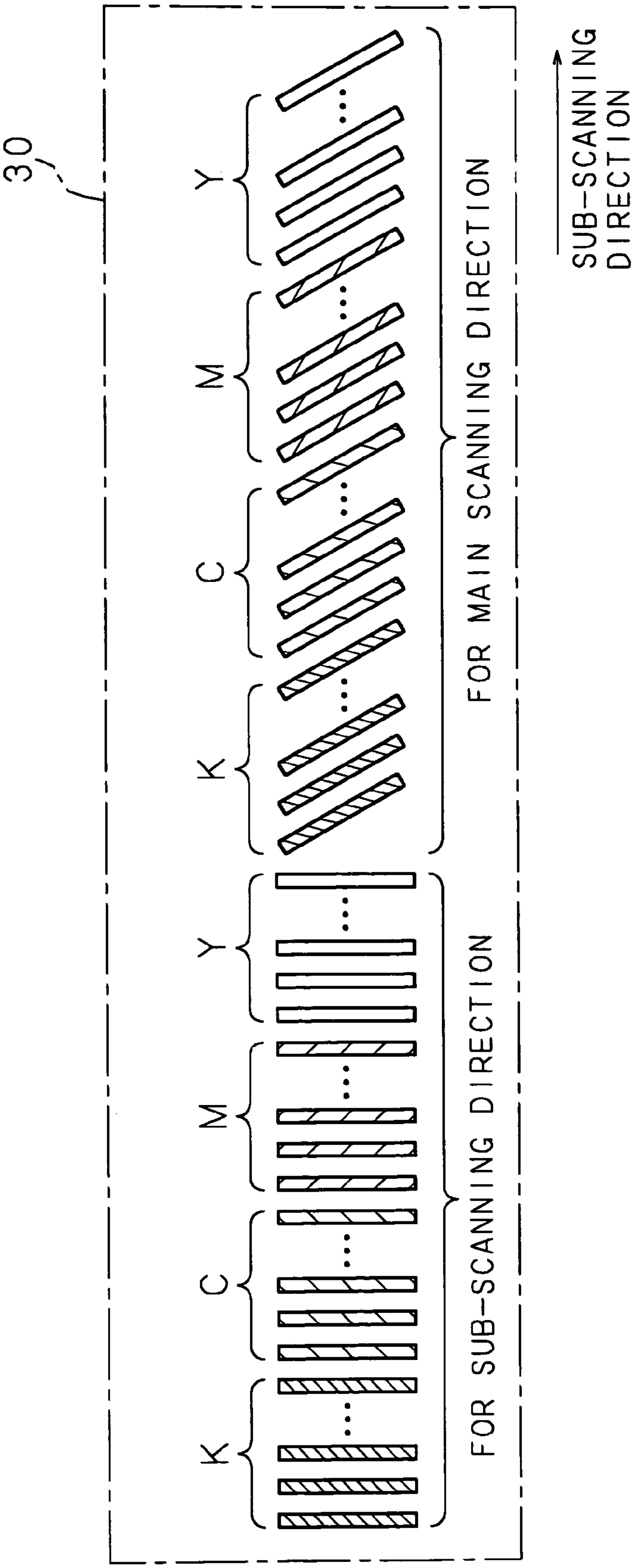
FIG. 1 PRIOR ART
FIG. 1 is a schematic diagram showing exemplary conventional adjustment marks.
Figure 2:
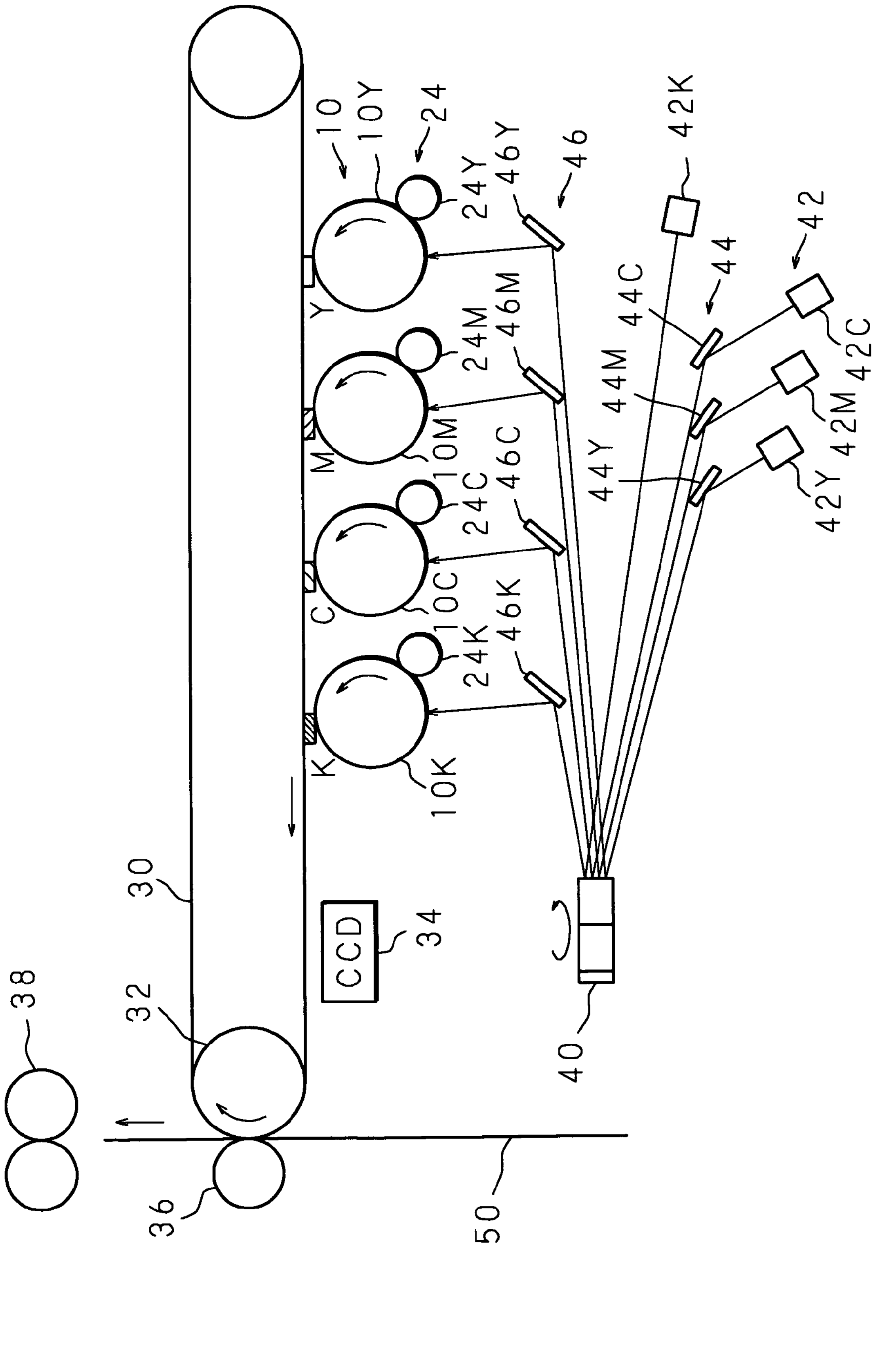
FIG. 2 is a schematic diagram showing an essential part configuration of an image forming apparatus of the present invention.

FIG. 2 is a schematic diagram showing an essential part configuration of an image forming apparatus of the present invention. The image forming apparatus includes, as principal components, photosensitive drums (photosensitive bodies) 10 on which an image is formed; laser diodes 42 that output laser beams; first mirrors 44 that guide the laser beams outputted from the laser diodes 42 to the photosensitive drums 10; a polygon mirror 40; second mirrors 46; developing rollers 24 that develop a latent image formed on the photosensitive drums 10 by the laser beams; and a transfer belt 30 onto which the image formed on the photosensitive drums 10 is transferred.

The photosensitive drums 10 include a photosensitive drum for black 10K, a photosensitive drum for cyan 10C, a photosensitive drum for magenta 10M, and a photosensitive drum for yellow 10Y. Similarly, the developing rollers 24 include a developing roller for black 24K, a developing roller for cyan 24C, a developing roller for magenta 24M, and a developing roller for yellow 24Y. The laser diodes 42 include a laser diode for black 42K, a laser diode for cyan 42C, a laser diode for magenta 42M, and a laser diode for yellow 42Y.

The first mirrors 44 include a first mirror for cyan 44C, a first mirror for magenta 44M, and a first mirror for yellow 44Y that guide laser beams outputted from the laser diode for cyan 42C, the laser diode for magenta 42M, and the laser diode for yellow 42Y, respectively, to the polygon mirror 40. The second mirrors 46 include a second mirror for black 46K, a second mirror for cyan 46C, a second mirror for magenta 46M, and a second mirror for yellow 46Y that guide laser beams reflected by the polygon mirror 40 to the photosensitive drum for black 10K, the photosensitive drum for cyan 10C, the photosensitive drum for magenta 10M, and the photosensitive drum for yellow 10Y, respectively.

The transfer belt 30 has a loop shape. The photosensitive drums for the respective color components 10K, 10C, 10M, and 10Y are disposed in line so as to face a surface of the transfer belt 30. An image transferred onto the transfer belt 30 is moved from the right to the left in the drawing with respect to the photosensitive drums 10, by a belt drive roller 32 which is in internal contact with the transfer belt 30. In addition, a CCD (Charge Coupled Device) 34 is disposed so as to face the surface of the transfer belt 30. The CCD 34 is disposed at a side closer to a belt movement direction than the photosensitive drums 10. The photosensitive drums 10 are disposed in the order, from the CCD 34, of the photosensitive drum for black 10K, the photosensitive drum for cyan 10C, the photosensitive drum for magenta 10M, and the photosensitive drum for yellow 10Y in a direction opposite to the belt movement direction.

A transfer roller 36 is disposed so as to face the belt drive roller 32 with the transfer belt 30 interposed therebetween. The image is transferred from the transfer belt 30 onto a sheet 50 passing through the transfer roller 36 and then fused by fuser rollers 38.

Figure 3:
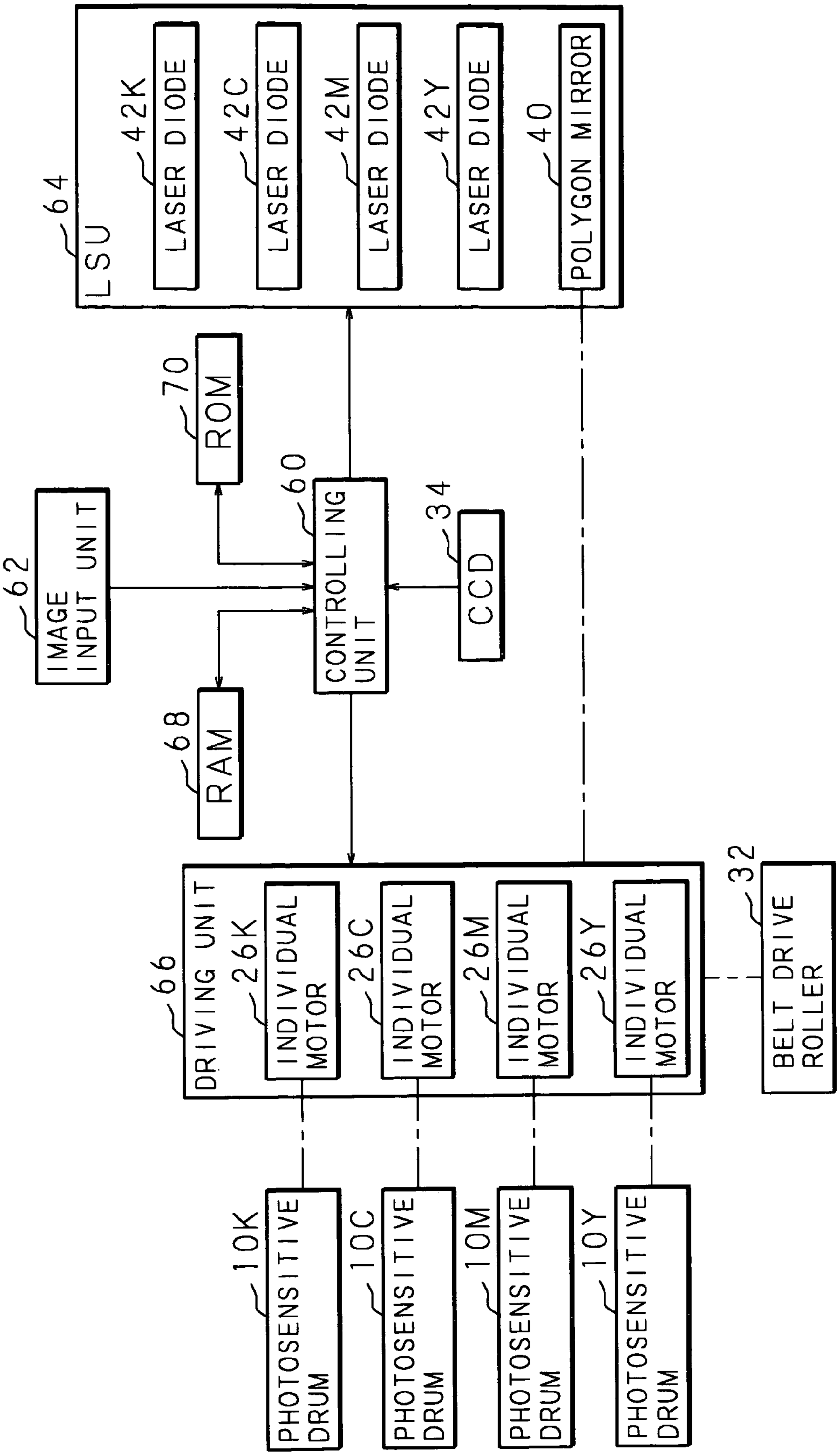
FIG. 3 is a block diagram showing the essential part configuration of the image forming apparatus.

FIG. 3 is a block diagram showing the essential part configuration of the image forming apparatus. The image forming apparatus includes an LSU (Laser Scanning Unit) 64 including the laser diodes 42K, 42C, 42M, and 42Y and the polygon mirror 40; the CCD 34 that detects images for adjustment of image formation positions (hereinafter, referred to as adjustment marks) which are formed on the transfer belt 30; a driving unit 66 that drives the photosensitive drums 10, the belt drive roller 32, the polygon mirror 40, and the like; an image input unit 62, such as an image scanner, that reads a document image; a controlling unit 60, such as a CPU (Central Processing Unit), that is connected to the CCD 34, the LSU 64, the driving unit 66, and the image input unit 62; and a RAM 68 and a ROM 70 that are connected to the controlling unit 60.

The controlling unit 60 controls each of the component units included in the apparatus, based on a program and data stored in the ROM 70. The driving unit 66 includes a motor that drives the polygon mirror 40; a motor that drives the belt drive roller 32; and individual motors 26K, 26C, 26M, and 26Y that drive the photosensitive drums 10K, 10C, 10M, and 10Y, respectively.

The controlling unit (formation controlling unit) 60 controls, when adjusting image formation positions, the LSU (image forming unit) 64 such that the adjustment marks are formed in their corresponding reference positions. The controlling unit 60 determines shifts of detected positions where the marks are actually detected by the CCD 34, from their corresponding reference positions. Then, the controlling unit 60 controls the LSU 64 to minimize the shifts and thereby adjusts the image formation positions. When adjusting image formation positions, the LSU 64 forms, by control of the controlling unit 60, a plurality of marks of the same color on the transfer belt 30.

Figure 4:
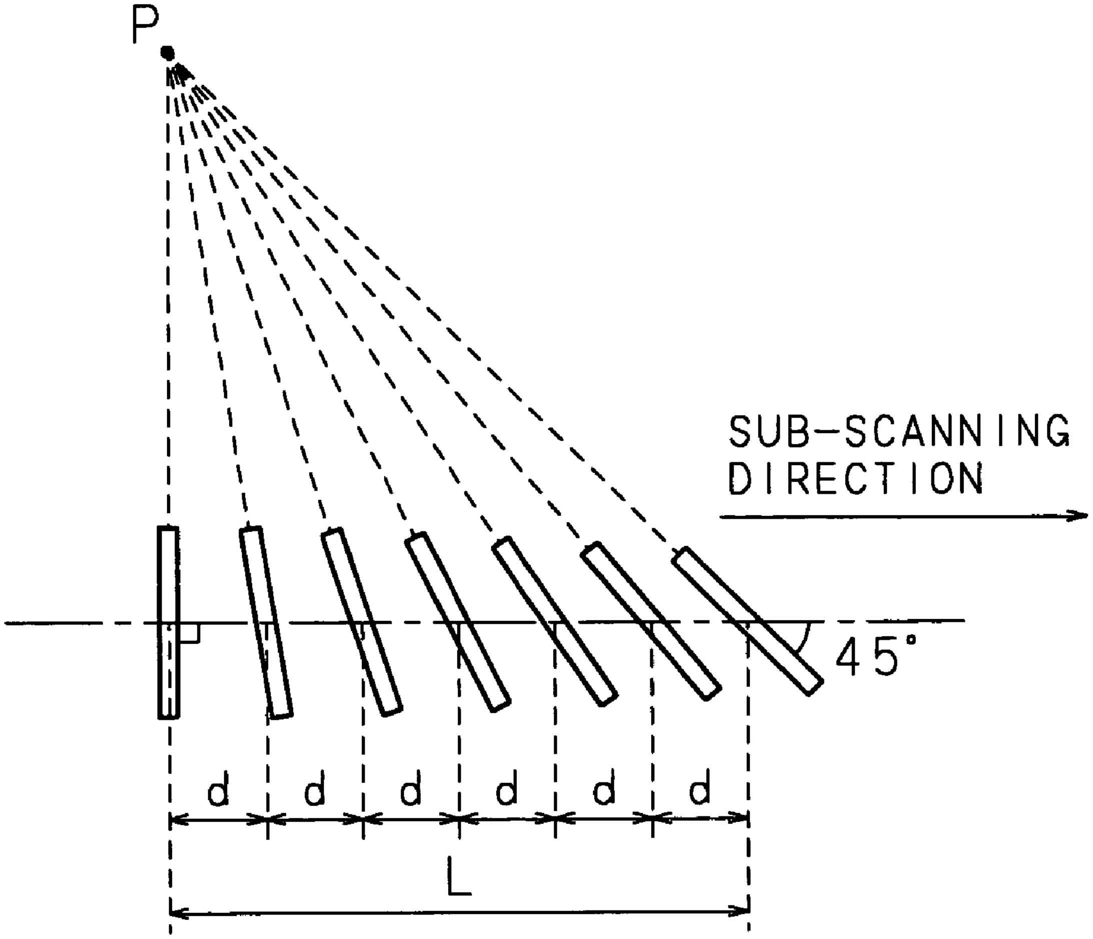
FIG. 4 is a schematic diagram showing exemplary formation of adjustment marks of the same color.
Figure 5:
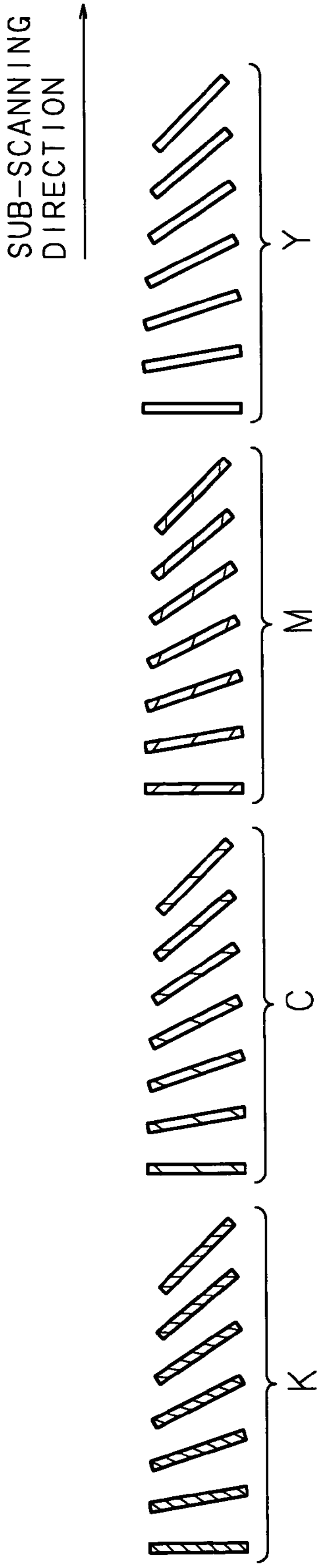
FIG. 5 is a schematic diagram showing exemplary formation of adjustment marks of a plurality of colors.

FIG. 4 is a schematic diagram showing exemplary formation of adjustment marks of the same color. FIG. 5 is a schematic diagram showing exemplary formation of adjustment marks of a plurality of colors. The controlling unit 60 allows the LSU 64 to form, for each color, a plurality of adjustment marks having different tilts with respect to the main scanning direction (or the sub-scanning direction). As shown in FIG. 4, the adjustment marks of the same color are made up of seven line-shaped marks having different tilts. The seven adjustment marks are formed on a center line (dash-dotted line) parallel to the sub-scanning direction at regular intervals ds. The seven marks are tilted to the main scanning direction such that extensions of the respective marks intersect with a virtual reference point P. Note, however, that one of both ends of the seven marks (left end in the drawing) intersects with the center line at right angles and the other one (right end in the drawing) intersects with the center line at a 45-degree angle. A set of the seven adjustment marks having different tilts, shown in FIG. 4, is formed for each color, as shown in FIG. 5.

A distance L (six ds in the example of FIG. 4) on the center line between both ends of the adjustment marks of the same color having different tilts is a distance (e.g., 100 millimeters) equal to or greater than the length of the circumference (e.g., 93 millimeters) of a photosensitive drum 10. Each interval d between the seven marks is set to be an interval (e.g., 1.2 millimeters) equal to or greater than a reading range (e.g., 0.6 millimeter) of the CCD 34 so that a plurality of marks are not included in the reading range.

The controlling unit 60 calculates a shift of a detected position of each adjustment mark from a reference position in which each adjustment mark should be formed. The controlling unit 60 then calculates the tilt and intercept of a regression line (y=ax+b, where x represents the reference position and y represents the shift) that uses the reference positions and the calculated shifts as variables. Based on the calculated tilt and intercept, the controlling unit 60 determines an amount of shift in the main scanning direction and an amount of shift in the sub-scanning direction.

Figure 6A:
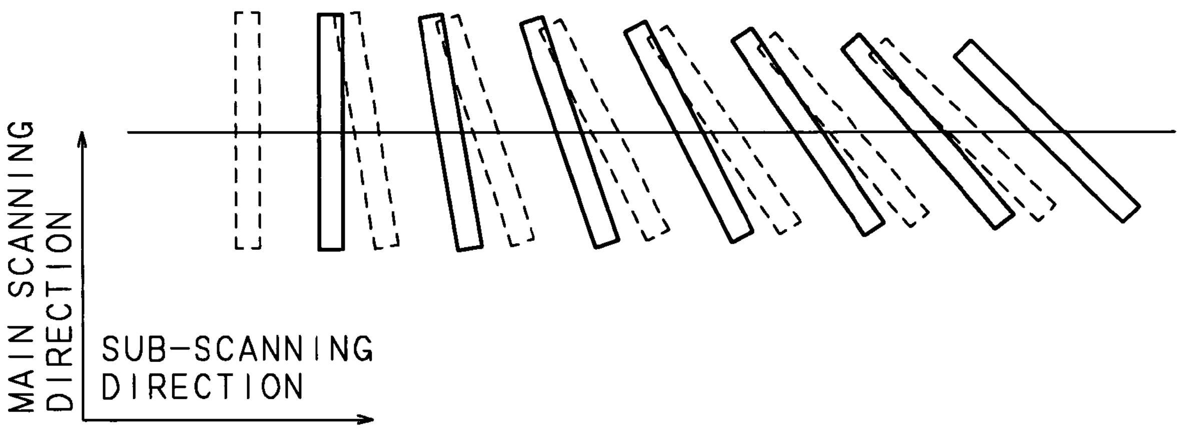
FIGS. 6A and 6B are schematic diagrams showing exemplary shifts when the adjustment marks are shifted only in a sub-scanning direction.
Figure 6B:
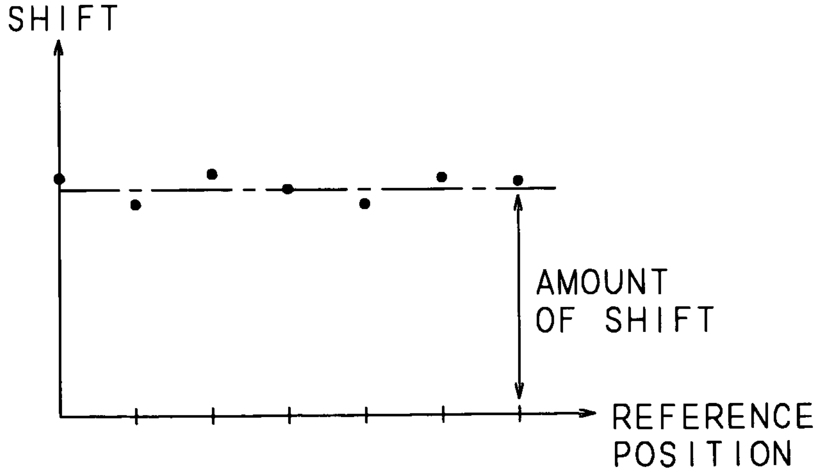

FIGS. 6A and 6B are schematic diagrams showing exemplary shifts when the adjustment marks are shifted only in the sub-scanning direction. When the adjustment marks are shifted only in the sub-scanning direction, the shifts of detected positions (solid lines) from the reference positions (broken lines) on the center line are substantially the same between the adjustment marks. Thus, a regression line (dash-dotted line in FIG. 6B) that uses the reference positions and the shifts of the adjustment marks as variables is determined. Then, the intercept of the regression line is set as the amount of shift in the sub-scanning direction.

Figure 7A:
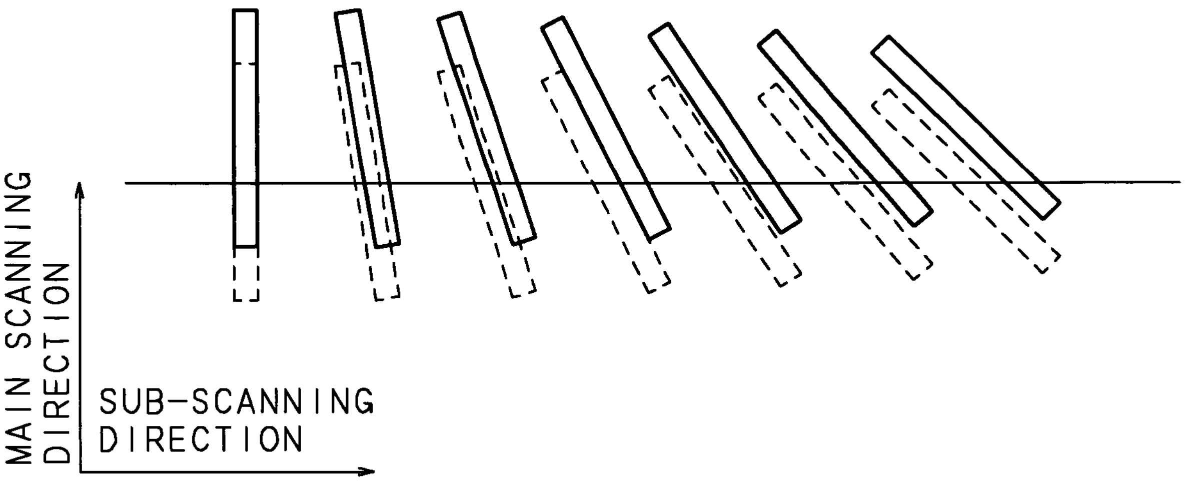
FIGS. 7A and 7B are schematic diagrams showing exemplary shifts when the adjustment marks are shifted only in a main scanning direction.
Figure 7B:
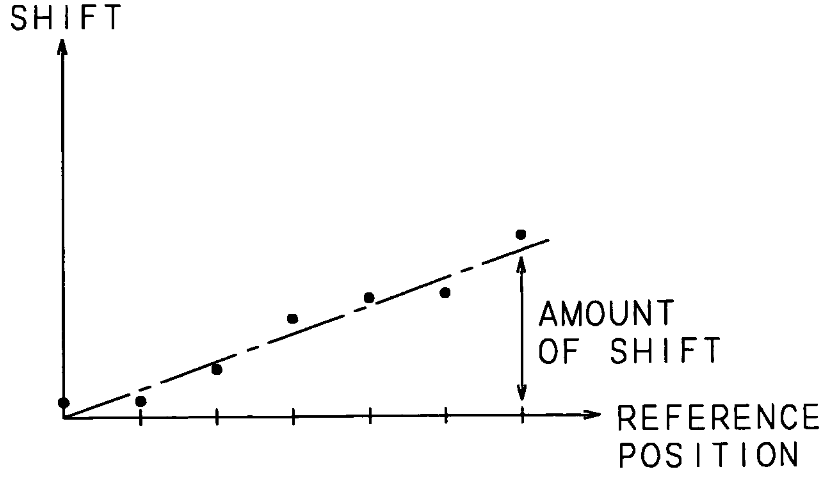

FIGS. 7A and 7B are schematic diagrams showing exemplary shifts when the adjustment marks are shifted only in the main scanning direction. When the adjustment marks are shifted only in the main scanning direction, the shifts of detected positions (solid lines) from the reference positions (broken lines) on the center line are different between the adjustment marks. The shift increases in an inverse proportion to the angle between the adjustment mark and the center line. Thus, a regression line (dash-dotted line in FIG. 7B) that uses the reference positions of the adjustment marks and the shifts from the reference positions as variables is determined. Then, a shift calculated from the regression line in a reference position of an adjustment mark that forms a 45-degree angle with the center line is set as the amount of shift in the main scanning direction.

Figure 8A:
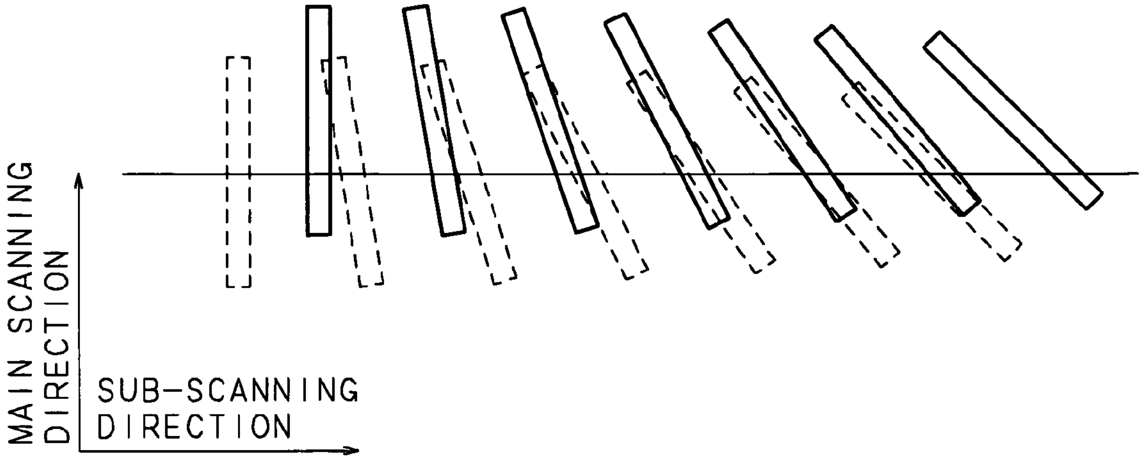
FIGS. 8A and 8B are schematic diagrams showing exemplary shifts when the adjustment marks are shifted both in the main scanning direction and the sub-scanning direction.
Figure 8B:
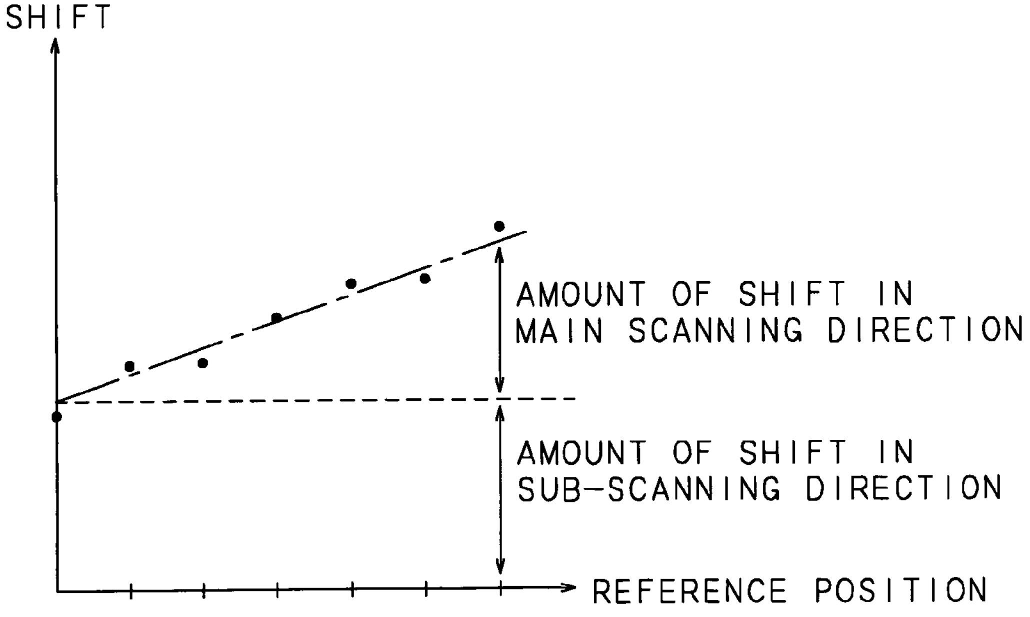

FIGS. 8A and 8B are schematic diagrams showing exemplary shifts when the adjustment marks are shifted both in the main scanning direction and the sub-scanning direction. When the adjustment marks are shifted both in the main scanning direction and the sub-scanning direction, the shifts of detected positions (solid lines) from the reference positions (broken lines) on the center line are ones obtained by combining those described in FIGS. 6B and 7B. Thus, in a regression line (dash-dotted line in FIG. 8B) that uses the reference positions of the adjustment marks and the shifts from the reference positions as variables, a shift calculated from the regression line in a reference position of an adjustment mark that forms a 45-degree angle with the center line is set as the amount of shift in the main scanning direction and an intercept of the regression line is set as the amount of shift in the sub-scanning direction.

For the position of each color component image, the controlling unit 60 determines an average value for the front and rear positions in a movement direction of a mark detected by the CCD 34, and sets the determined average value as a detected position of the adjustment mark. Since the photosensitive drums 10 and the belt drive roller 32 are rotated at a constant speed and the transfer belt 30 moves at a constant speed, a formation position can be expressed in time. Specifically, a time difference between a detection time of an adjustment mark and a time corresponding to a reference position is a shift in a formation position.

Figure 9A:
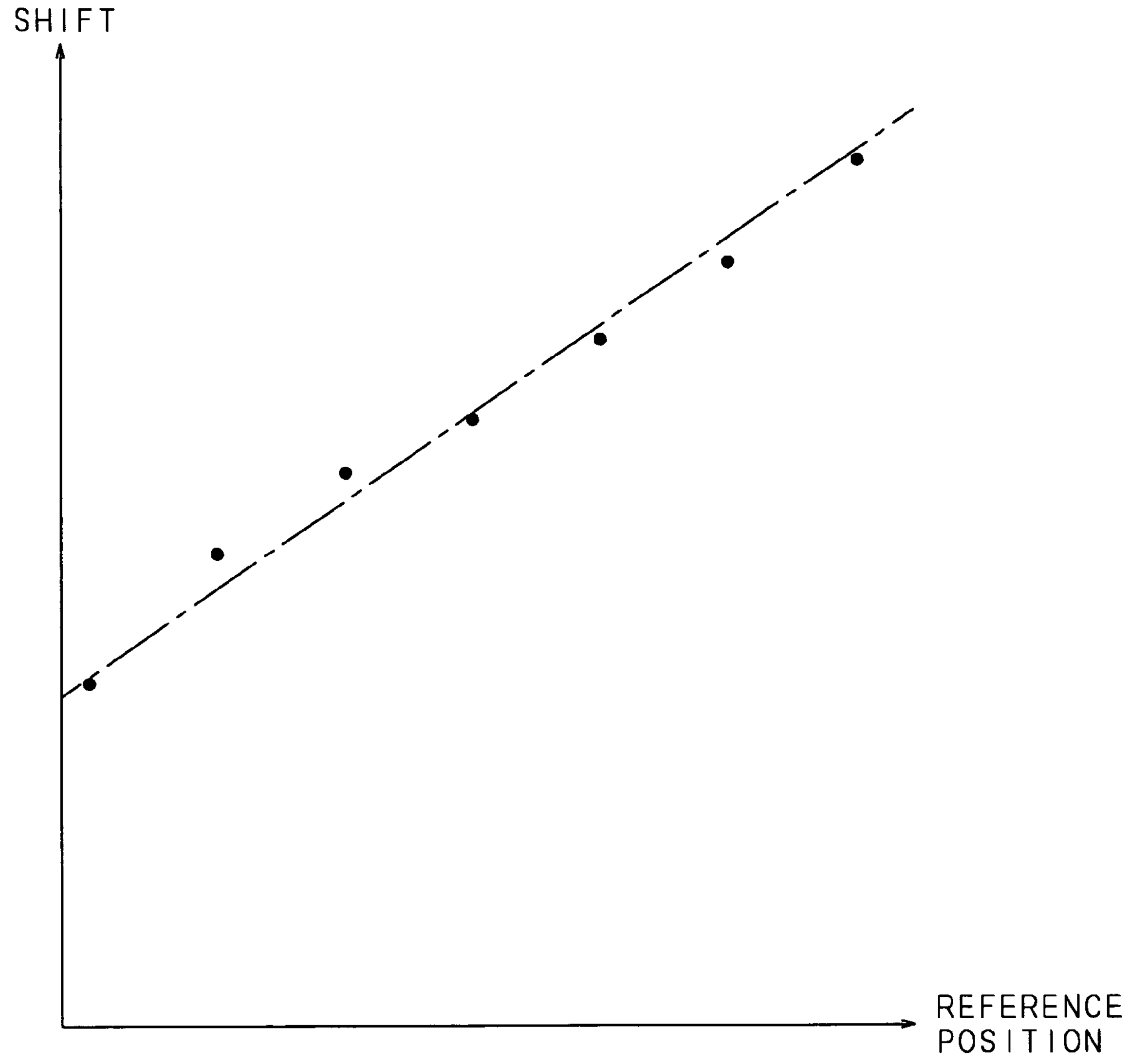
FIGS. 9A and 9B are schematic diagrams showing exemplary setting of a reference phase.
Figure 9B:
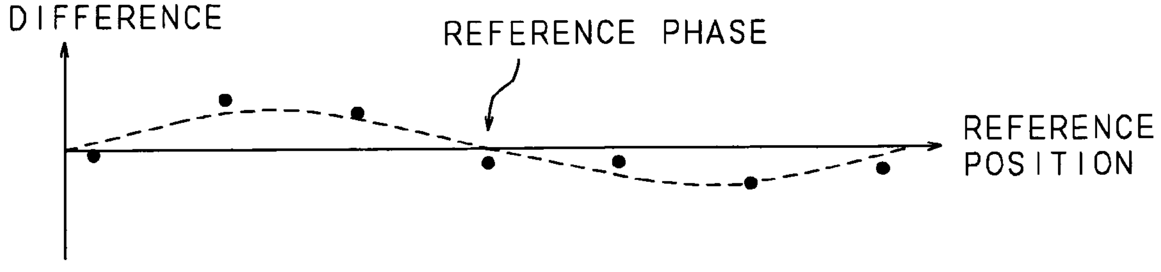

The photosensitive drums 10 have a drum shape. The controlling unit 60 sets a reference phase of the rotation of each photosensitive drum based on differences between calculated shifts and a regression line. FIGS. 9A and 9B are schematic diagrams showing exemplary setting of a reference phase. A plurality of adjustment marks are formed over the length of the circumference (one rotation period) of a surface of each photosensitive drum 10. The controlling unit 60 selects a maximum value and a minimum value from differences between calculated shifts and a regression line. The controlling unit 60 then calculates an intermediate value between the selected maximum and minimum values and sets a portion of the calculated intermediate value as a reference phase. For example, when the number of data between a maximum value and a minimum value is odd, the controlling unit 60 sets a reference position in a central portion between the maximum value and the minimum value, as a reference phase. When the number of data between a maximum value and a minimum value is even, the controlling unit 60 sets, between two reference positions in a central portion between the maximum value and the minimum value, one that is closer to the center of an amplitude (=the maximum value−the minimum value), as a reference phase. The controlling unit 60 then controls the individual motors 26K, 26C, 26M, and 26Y for the respective color components such that reference colors of the respective color components match with one another.

Now, formation position adjustment using the image forming apparatus of the present invention will be described.

Figure 10:
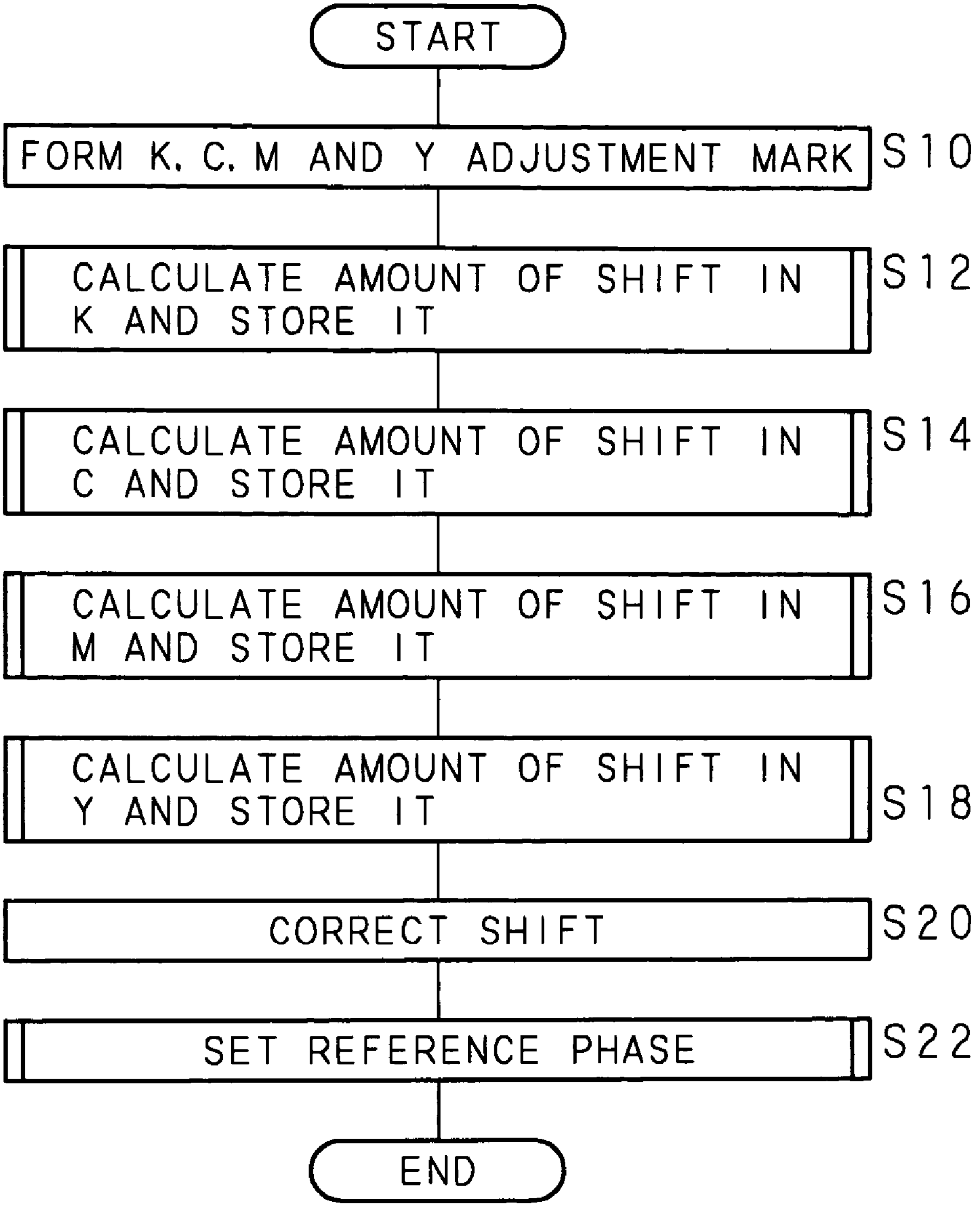
FIG. 10 is a flowchart showing exemplary shift correction and setting of a reference phase.

FIG. 10 is a flowchart showing exemplary shift correction and setting of a reference phase. When adjusting an image formation position, the controlling unit 60 controls the LSU 64 and the like, to form K, C, M, and Y adjustment marks shown in FIG. 5 (S11). The formed adjustment marks are detected by the CCD 34. The controlling unit 60 calculates an amount of shift in K and stores in the RAM 68 the calculated amount of shift in K (S12); calculates an amount of shift in C and stores in the RAM 68 the calculated amount of shift in C (S14); calculates an amount of shift in M and stores in the RAM 68 the calculated amount of shift in M (S16); and calculates an amount of shift in Y and stores in the RAM 68 the calculated amount of shift in Y (S18). Then, the controlling unit 60 controls the LSU 64 and the like to eliminate the calculated amount of shift in each color component and thereby correct the shifts (S20). The controlling unit 60 sets a reference phase of each color component (S22).

Figure 11:
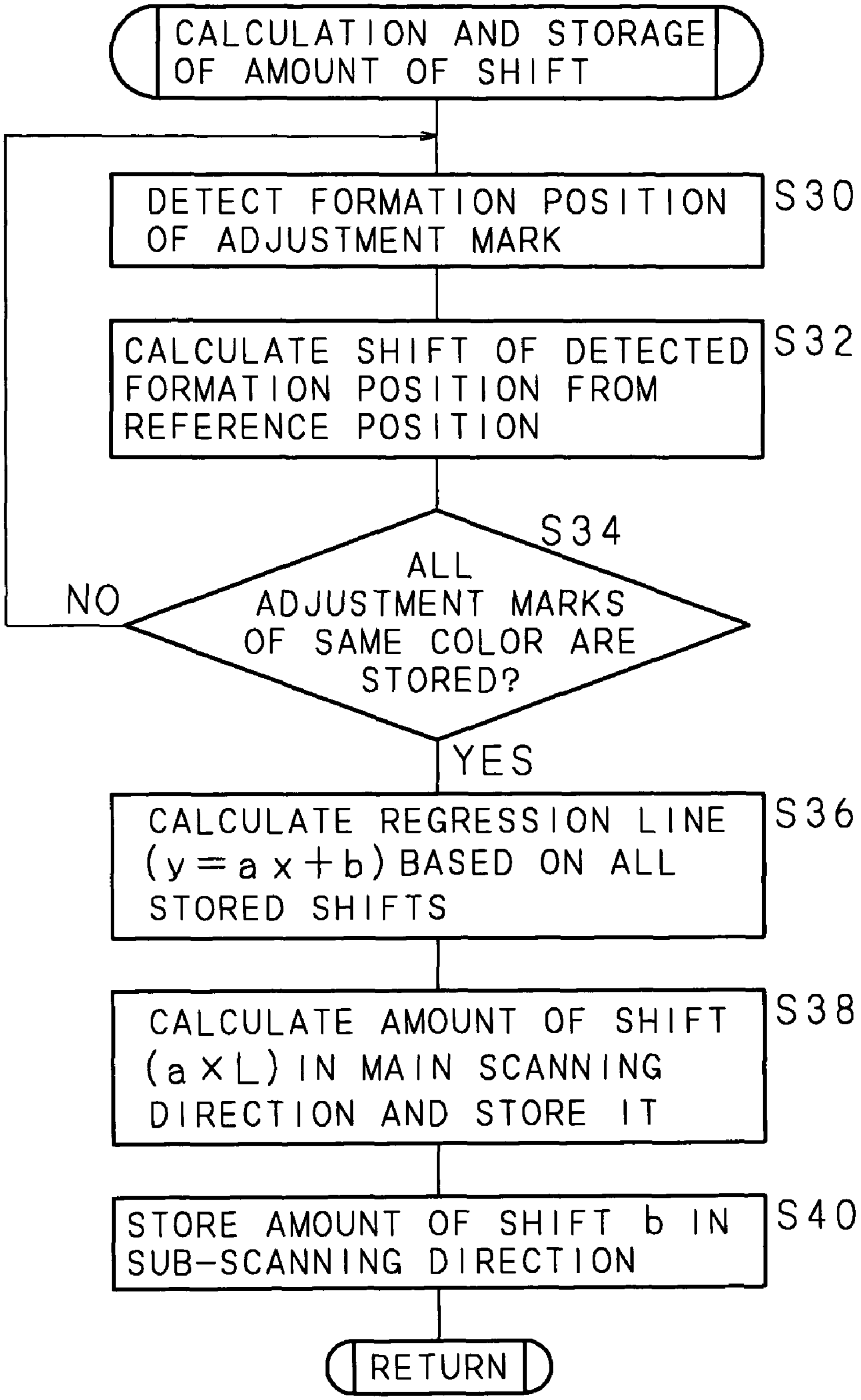
FIG. 11 is a flowchart showing exemplary calculation and storage of an amount of shift.

FIG. 11 is a flowchart showing exemplary calculation and storage of an amount of shift (S12, S14, S16, and S18 in FIG. 10). When a formation position of an adjustment mark is detected by the CCD 34 (S30), the controlling unit 60 calculates a shift of the detected formation position from a reference position of the adjustment mark and stores the calculated shift in the RAM 68 (S32). After shifts in all adjustment marks of the same color (seven marks in the example of FIG. 4) are calculated and stored in the RAM 68 ("YES" at S34), the controlling unit 60 calculates a regression line (y=ax+b, where x represents the reference position and y represents the shift) based on all stored shifts (S36). The controlling unit 60 then calculates an amount of shift (a×L) in the main scanning direction and stores the calculated amount of shift in the RAM 68 (S38), and then stores an amount of shift b in the sub-scanning direction in the RAM 68 (S40).

Figure 12:
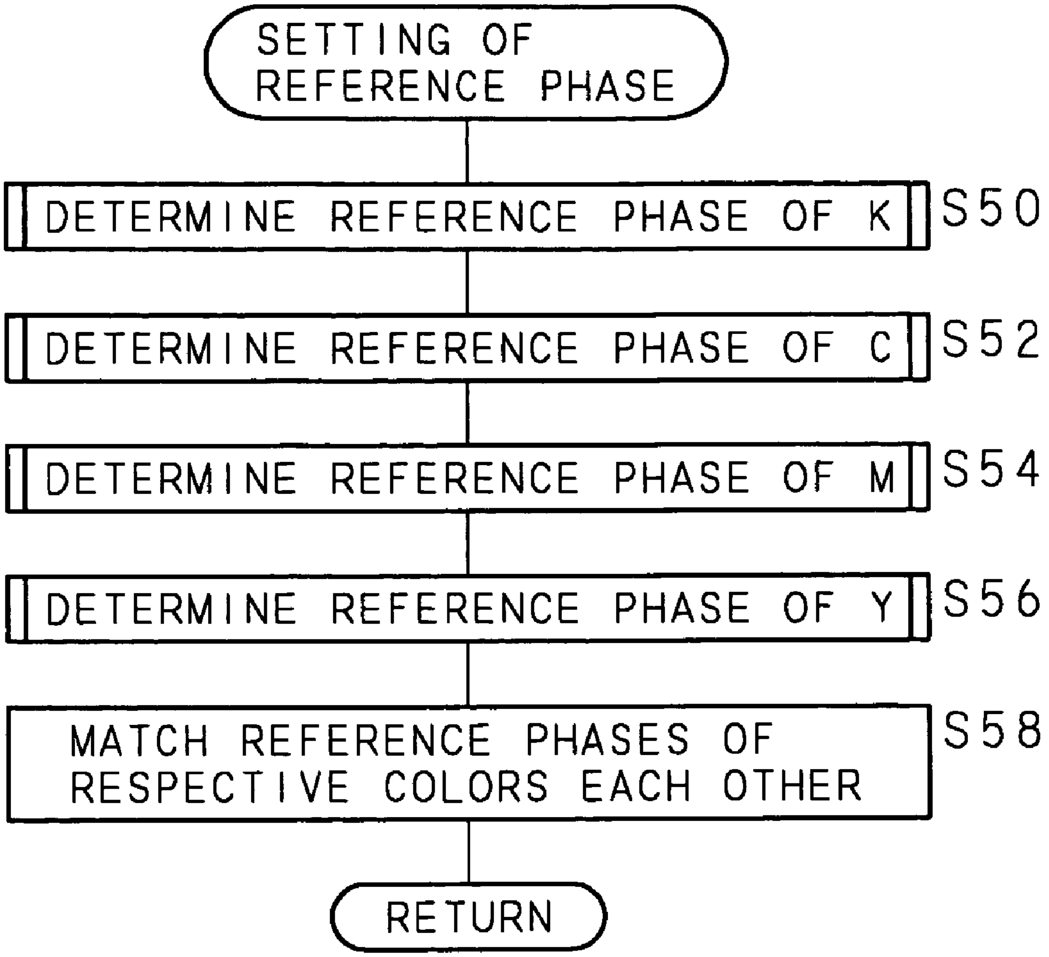
FIG. 12 is a flowchart showing exemplary setting of a reference phase.
Figure 13:
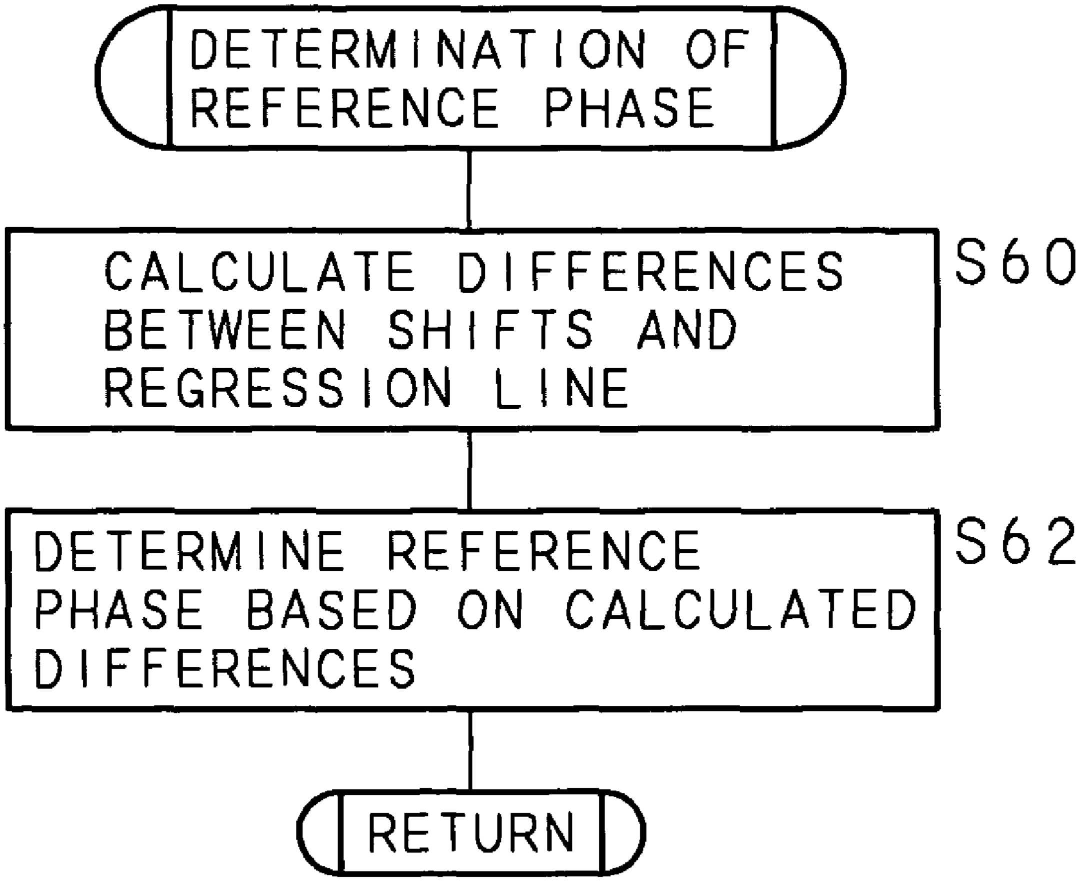
FIG. 13 is a flowchart showing exemplary determination of a reference phase.

FIG. 12 is a flowchart showing exemplary setting of a reference phase (S22 in FIG. 10). The controlling unit 60 determines a reference phase of K (S50), determines a reference phase of C (S52), determines a reference phase of M (S54), and determines a reference phase of Y (S56). The controlling unit 60 then controls the driving unit 66 (the individual motors) and the like such that the reference phases of the respective colors match with one another (S58). FIG. 13 is a flowchart showing exemplary determination of a reference phase (S50, S52, S54, and S56 in FIG. 12). The controlling unit 60 calculates differences between shifts and a regression line (S60) and determines a reference phase based on the calculated differences (S62).

Although, in the above-described embodiment, a formation position is corrected for each color by using seven adjustment marks having different tilts, the number of adjustment marks is not limited to seven and any number of adjustment marks can be used.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image forming apparatus comprising:

an image forming unit that forms a color image in which a plurality of color component images are superimposed;

a formation controlling unit that allows the image forming unit to form, in a predetermined direction, a plurality of images for adjustment of formation positions of the respective color component images, wherein the formation controlling unit allows the image forming unit to form, for each color, a plurality of adjustment images having different tilts with respect to the predetermined direction;

a first calculating unit that calculates a shift of a detected position of each adjustment image from a reference position in which each adjustment image should be formed;

a second calculating unit that calculates a tilt and an intercept of a regression line that uses the reference positions and the calculated shifts as variables; and a third calculating unit that calculates a shift in a main scanning direction and a shift in a sub-scanning direction based on the calculated tilt and intercept.

2. The image forming apparatus according to claim 1, further comprising a plurality of photosensitive bodies each having a drum shape, on which the image is formed, wherein the formation controlling unit allows the image forming unit to form a plurality of adjustment images over a length of a circumference of each of the photosensitive bodies.

3. The image forming apparatus according to claim 2, wherein the photosensitive bodies are rotated, and the image forming apparatus further comprises a fourth calculating unit that calculates a reference phase of rotation of each of the photosensitive bodies based on differences between the calculated shifts and the regression line.

4. A method of adjusting a color shift in an image forming apparatus that forms a color image in which a plurality of color component images are superimposed, the method comprising:

forming, in a predetermined direction, a plurality of images for adjustment of formation positions of the respective color component images, wherein the adjustment images formed for each color have different tilts with respect to the predetermined direction;

calculating a shift of a detected position of each adjustment image from a reference position in which each adjustment image should be formed;

calculating a tilt and an intercept of a regression line that uses the reference positions and the calculated shifts as variables; and determining a shift in a main scanning direction and a shift in a sub-scanning direction based on the calculated tilt and intercept.

5. The method of adjusting a color shift according to claim 4, wherein a plurality of adjustment images are formed over a length of a circumference of each of a plurality of photosensitive bodies having a drum shape.

6. The method of adjusting a color shift according to claim 5, wherein the photosensitive bodies are rotated, and the method further comprises calculating a reference phase of rotation of each of the photosensitive bodies based on differences between the calculated shifts and the regression line.

* * * * *